(12) United States Patent
Debreczeni

(10) Patent No.: US 9,535,423 B1
(45) Date of Patent: Jan. 3, 2017

(54) AUTONOMOUS VEHICLE WITH IMPROVED VISUAL DETECTION ABILITY

(71) Applicant: AdasWorks Kft., Budapest (HU)

(72) Inventor: Gergely Debreczeni, Budapest (HU)

(73) Assignee: ADASWORKS KFT., Budapest (HU)

(*) Notice: Subject to any disclaimer, the term of this patent is extended or adjusted under 35 U.S.C. 154(b) by 0 days.

(21) Appl. No.: 15/084,084

(22) Filed: Mar. 29, 2016

(51) Int. Cl.
*G01C 22/00* (2006.01)
*G05D 1/02* (2006.01)
*G05D 1/00* (2006.01)
*B62D 15/02* (2006.01)

(52) U.S. Cl.
CPC ........... *G05D 1/0246* (2013.01); *B62D 15/025* (2013.01); *G05D 1/0088* (2013.01)

(58) Field of Classification Search
CPC ....... G05D 1/0094; B60C 11/24; B60C 19/00; B60J 7/0573
USPC . 701/28, 36; 340/12.25, 5.61, 5.64; 345/501
See application file for complete search history.

(56) References Cited

U.S. PATENT DOCUMENTS

| | | | |
|---|---|---|---|
| 5,040,116 A | 8/1991 | Evans, Jr. et al. | |
| 5,559,695 A * | 9/1996 | Daily | G01S 11/12 345/501 |
| 9,121,717 B1 | 9/2015 | Zhu | |
| 9,201,424 B1 * | 12/2015 | Ogale | G05D 1/0094 |

* cited by examiner

*Primary Examiner* — Gertrude Arthur Jeanglaud
(74) *Attorney, Agent, or Firm* — Young & Thompson

(57) ABSTRACT

The invention provides an autonomous vehicle capable of driving independently through a path of intense traffic and transporting objects or people, even on rough surfaces, while ensuring safety of the vehicle and general road safety. The autonomous vehicle includes at least one variable pitch camera for producing images to be used for a computer vision to control the autonomous vehicle. The invention facilitates changing the pitch of the variable pitch camera to maximize camera image clarity and/or resolution as the autonomous vehicle moves. The images can be used for lane detection, pedestrian detection, three-dimensional (3D) reconstruction of an environment and/or pothole detection. With the invention, at least one image from the variable pitch camera is used in controlling the movement and/or the trajectory of the autonomous vehicle.

24 Claims, 14 Drawing Sheets

20

At least one camera of an autonomous vehicle has a variable and movable pitch to a direction of travel that is controlled by a motor — 200

Change the pitch of the camera to maximise camera image clarity and/or resolution as the autonomous vehicle moves — 210

Use at least one image from the variable pitch camera to control the movement of the autonomous vehicle — 220

The camera is used in any of the following: lane detection, pedestrian detection, reconstruction of an environment and/or pothole detection — 230

*FIG. 2*

AUTONOMOUS VEHICLE WITH IMPROVED VISUAL DETECTION ABILITY

TECHNICAL FIELD

The present disclosure relates to an autonomous vehicle with cameras, and more particularly to an autonomous car with cameras for improving visual detection abilities of the autonomous car.

BACKGROUND

Autonomous vehicles with a capability of independent control operation with minimal human intervention can be used in transporting people and objects. Typically, some autonomous vehicles require an initial input from an operator, while some other designs of the autonomous vehicles are under constant operator control. Some autonomous vehicles can be operated entirely by remote. For example, automatic parking is an example of the autonomous vehicle in operation in a normal human driven car, such as Tesla.

Further, the autonomous vehicles are required to operate in dynamically changing environmental conditions. For example, the autonomous vehicles may be required to track a path over varying surface stretches, at varying speeds and across different obstacles. The varying surface may include flat, winding, or hilly terrains and the different obstacles may include other vehicles or humans appearing at unexpected places or times.

At a broader level, the autonomous vehicles include a control system configured to receive sensory data corresponding to environment from a number of information gathering devices. The information gathering devices may include light amplification by stimulated emission of radiation (laser), sound navigation and ranging (sonar), radio detection and ranging (radar), light detection and ranging (LIDAR), etc. Of late, the autonomous vehicles have also been equipped with commercial cameras for information gathering to ensure maximum safety.

In conventional autonomous vehicles, the cameras are mounted in a fixed position and/or orientation which prevents the camera from achieving an optimal performance and results in unreliable image reconstruction accuracy. Due to the unreliable image reconstruction, objects represented in the images may be lost in a homogeneous texture background, thereby resulting in inaccurate lane detection functionalities, position reconstructions, detection of road markings, etc. The unreliability of the image reconstruction may be dangerous for road safety, detection of objects in vehicular path and environment, and reduce the manoeuvring abilities of the autonomous vehicle.

Inaccuracies in examining how and to what extent the positioning and/or the orientation of the various sensors on a vehicle chassis influence the detection capabilities of the autonomous vehicle. Thus, as a result the manoeuvring abilities of the autonomous vehicle are also hampered, thereby making the autonomous vehicle unreliable.

Autonomous vehicle with a movable camera was already known in Evans et al. U.S. Pat. No. 5,040,116. This document is cited here as reference.

How on-board camera pitch influences the computer vision image of an autonomous car is analysed in U.S. Pat. No. 9,121,717. This document is also cited here as reference.

However, the prior art is deficient in techniques that would improve image quality of the on-board cameras as the vehicle moves.

SUMMARY

It is an object of the invention to address and improve the aforementioned deficiency in the prior art.

It is an object of the invention to facilitate control of an autonomous vehicle by using one or more variable pitch cameras positioned at different locations and/or orientations of the autonomous vehicle.

In one aspect of the invention a plurality of variable pitch cameras is installed in the autonomous vehicle at different positions and/or movable orientations. The variable pitch cameras are used to obtain images at different non-zero pitch angles to the direction of motion of the autonomous vehicle, for improving detection capabilities of the autonomous vehicle.

In another aspect of the invention the pitch angle of each variable pitch camera is dynamically changed as the autonomous vehicle moves, to maximize image clarity and/or resolution thereby ensuring optimal lane detection and/or object detection in the path of the autonomous vehicle. In an example, the non-zero pitch angle of the variable pitch cameras may be selected based on a distance of the autonomous vehicle from an object in the navigation path of the autonomous vehicle, or different camera configurations related to a focal length, a sensor size, a camera height, etc., when the distance of the object from the autonomous vehicle is short.

In a further aspect of the invention, the orientation of at least one variable pitch camera may be dynamically adjusted for better imaging in a given traffic situation. For example, at a given pitch angle, the variable pitch camera identifies another vehicle in the path of the autonomous vehicle and dynamically produces an image of the other vehicle that can be used to control the movement of the autonomous vehicle.

In a further aspect of the invention, at least one image from at least one variable pitch camera is used to control the movement of the autonomous vehicle. For example, a control unit of the autonomous vehicle uses the produced image to calculate a time of impact and a distance between the vehicles and dynamically reduces the speed of the autonomous vehicle to avoid a clash with the other vehicle, along with ensuring lane keeping by the autonomous vehicle.

In this application, the autonomous vehicle is essentially a car, a truck, any two-wheeled or four-wheeled vehicle, a quadcopter or a drone configured for traffic control, etc. The autonomous vehicle primarily transports people and objects with or without a driver. I.e. a self driving car is understood to be an autonomous vehicle, and also a car that is self-driving in some situations, but driven by a human driver in other situations, is understood to be an autonomous vehicle in this application.

The autonomous vehicle may also control traffic congestion, ensure pedestrian safety, detect potholes in a navigation path of the autonomous vehicle, alert the driver on incorrect lane departure and perform many assisting functions to the driver that help him to drive safely and efficiently in accordance with the invention.

An autonomous vehicle in accordance with the invention comprises at least one camera configured to produce images for a computer vision used to control the autonomous vehicle, wherein, at least one said camera has a variable and movable pitch, yaw and/or roll to a direction of travel that is configured to be controlled, the pitch, yaw and/or roll of the at least one camera is configured to be changed to maximise camera image clarity and/or resolution as the autonomous vehicle moves, at least one image from the variable pitch, yaw and/or roll camera is configured to be used in controlling the movement of the autonomous vehicle.

A method for controlling an autonomous vehicle in accordance with the invention comprises at least one camera configured to produce images for a computer vision used to control the autonomous vehicle, comprising the following steps, at least one said camera has a variable and movable pitch, yaw and/or roll to a direction of travel that is controlled, the pitch, yaw and/or roll of the at least one camera is changed to maximise camera image clarity and/or resolution as the autonomous vehicle moves, and at least one image from the variable pitch, yaw and/or roll camera is used in controlling the movement of the autonomous vehicle.

A software program product in accordance with the invention is stored on a non-transient memory medium for controlling an autonomous vehicle, comprising at least one camera software configured to produce images for the computer vision software used to control the autonomous vehicle, wherein, at least one said camera has a variable and movable pitch, yaw and/or roll to the direction of travel that is configured to be controlled, the pitch, yaw and/or roll of at least one camera is configured to be changed to maximise camera image clarity and/or resolution as the autonomous vehicle moves, at least one image from the variable pitch, yaw and/or roll camera is configured to be used in controlling the movement of the autonomous vehicle.

The invention has sizable advantages. The invention results in a substantially precise and reliable camera based detection approach that significantly increases road safety with vehicles having autonomous vehicular motion. The autonomous vehicle equipped with the inventive variable pitch cameras has better reconstruction accuracies compared to images produced by horizontally aligned cameras. The non-zero camera pitch configuration yields accurate lane detection results, irrespective of any trajectory control model implemented by the autonomous vehicle. Also importantly, an optimal pitch angle of the variable pitch camera can be varied dynamically based on a speed of the autonomous vehicle. The variable pitch cameras, improve the image reconstruction accuracy for short distance ranges also, and this can be achieved by adjusting camera configurations, such as, focal length, sensor size, camera height, etc. This is helpful in creating high-detail maps for facilitating efficient driving. The invention better image detection results in a more precise and reliable camera based detection method that increases road safety associated with vehicles having autonomous operation. This leads to high precision lane keeping, and provides better trajectory control mechanisms both for self-driving cars and cars where humans driving is assisted by the autonomous vehicle functions.

The invention has been described with regard to the camera pitch relative to the movement of the vehicle, e.g the driving direction of the car. However, the invention is equally applicable to roll or yaw of the camera angle. Therefore in all embodiments of the invention, the roll or yaw angle could similarly be controlled separately or together in combination with pitch to improve image detection for the operation of the autonomous vehicle in accordance with the invention.

The best mode of the invention is considered to be a driverless car that can independently drive through a path prone to traffic, moving objects or people, or rough surfaces, along with ensuring safety of the car, its passengers and road safety. The movement of the driverless car is controlled based on different images taken at different pitch angles from multiple variable pitch cameras positioned at different locations and/or orientations of the car. The best mode of the invention makes it possible to effectively identify any human, object or other vehicle(s) in the path of the car, ensure lane keeping, and efficiently control the movement of the car.

BRIEF DESCRIPTION OF THE DRAWINGS

FIG. 2 demonstrates an embodiment 20 of a method for controlling the autonomous vehicle comprising at least one variable pitch camera, in accordance with the invention as a flow diagram.

Some of the embodiments are described in the dependent claims.

DETAILED DESCRIPTION OF EMBODIMENTS

The present disclosure provides an autonomous vehicle comprising a vehicle camera alignment system, a method, and a software program product for improving visual detection ability of the autonomous vehicle. The autonomous vehicle comprises at least one variable pitch camera. The variable pitch camera has a variable and movable non-zero pitch that can be adjusted in a direction of motion of the autonomous vehicle. The pitch of the variable pitch camera is varied to maximize image clarity and/or resolution of images captured by the variable pitch camera, thereby ensuring use of accurate data for reconstructing objects and/or an environment associated with a path of the autonomous vehicle. The more accurate image reconstruction data is used to control the movement of the autonomous vehicle.

Figure 1:
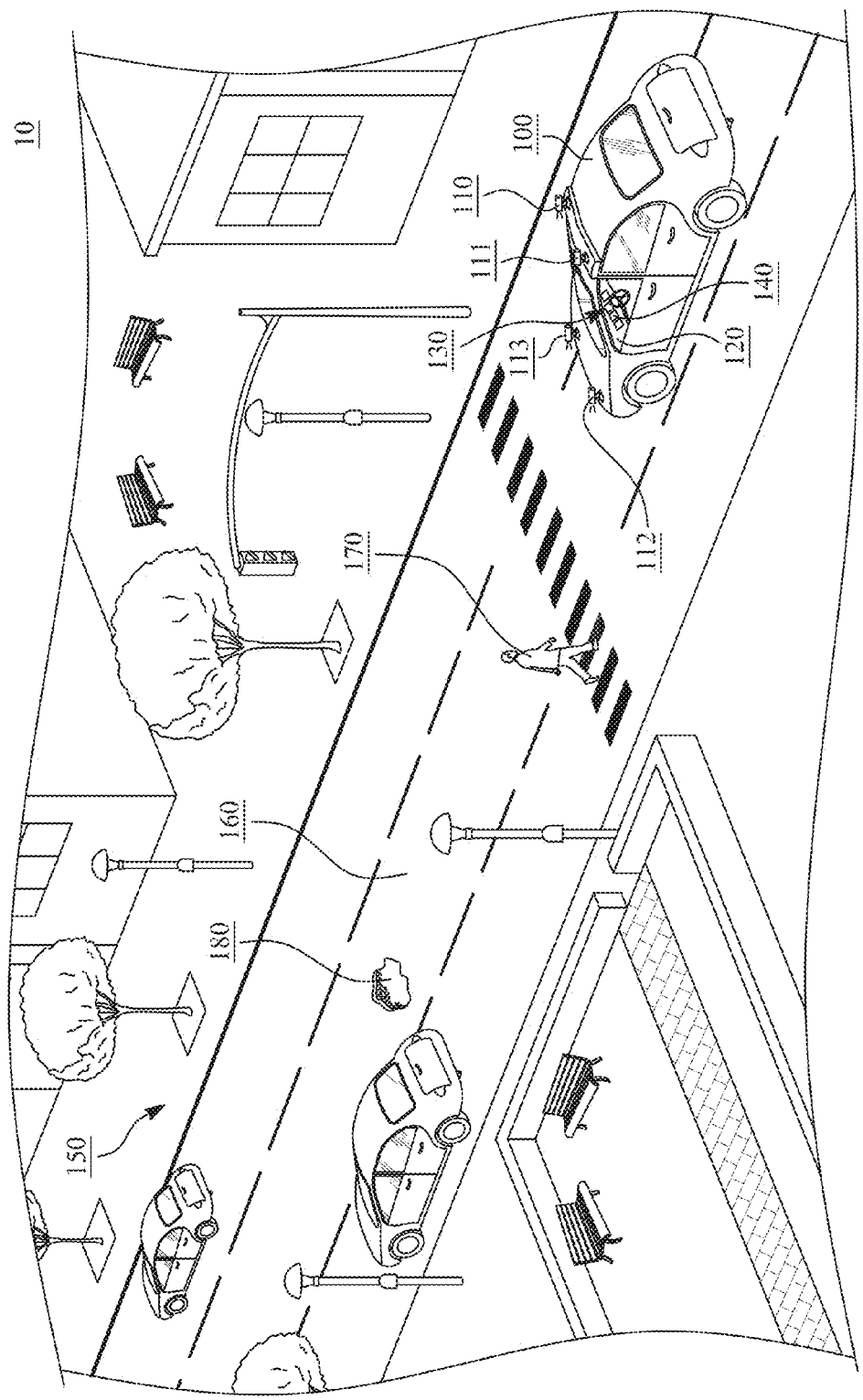
FIG. 1 demonstrates an embodiment 10 of an autonomous vehicle comprising multiple variable pitch cameras, in accordance with the invention as a diagram.

FIG. 1 demonstrates an embodiment 10 of the autonomous vehicle 100. The autonomous vehicle 100 comprises multiple variable pitch cameras 110, 111, 112, and 113 mounted at different positions of the autonomous vehicle 100 in accordance with the invention. The yaw and/or roll of the camera can also be similarly controlled from any position on the autonomous vehicle in accordance with the invention. The autonomous vehicle 100 is essentially a driverless car. In other examples, the autonomous vehicle 100 may be a truck, any two-wheeled or four-wheeled vehicle, a quadcopter or a drone configured to control traffic, etc. The autonomous vehicle 100 may be used for transporting people and objects in traffic.

The autonomous vehicle can also assist the driver in adjusting the driving to traffic congestion, ensuring pedestrian safety, detecting potholes in a navigation path of the autonomous vehicle 100, alerting the driver on lane departure and so forth, in accordance with the invention.

The variable pitch cameras 110, 111, 112, and 113 may include, for example, a pinhole camera, a digital camera, a video camera, a remote camera, a lipstick camera, cameras with CMOS sensors, cameras with CCD sensors, short range camera, long range camera, and/or fish eye camera and the like. Each of the variable pitch cameras 110, 111, 112, and 113 may be positioned, for example, on a front surface, a rear surface, a top surface and/or bottom surface of the autonomous vehicle 100 for capturing different images of people or objects and/or environment associated with a path of the autonomous vehicle 100. The different images are captured at varying zero or non-zero pitch angles.

The pitch angle is the angle between the parallel rays entering the camera to the movement direction of the vehicle. The pitch angle of the variable pitch cameras 110, 111, 112, and 113 may be determined and adjusted based on the required detection functionality to be performed by the autonomous vehicle 100. These include but are not limited to: lane detection, Structure From Motion (SFM), road markings, pothole detection, etc. The pitch angle of the variable pitch cameras 110, 111, 112, and 113 may also be determined based on the speed of the autonomous vehicle 100.

Still referring to FIG. 1, each of the variable pitch cameras 110, 111, 112, and 113 are configured to capture images and/or video feed 140 of static and/or dynamic objects associated with a navigation path or trajectory of the autonomous vehicle 100. The static objects may comprise, for example items of the three-dimensional (3D) environment 150, a lane 160, and/or a pothole 180. The dynamic objects may comprise, for example, a pedestrian 170. Each of the variable pitch cameras 110, 111, 112, and 113 employ conventional imaging and/or other detection techniques, such as, LIDAR, radar, etc., to detect the 3D environment 150, the lane 160, the pedestrian 170, and/or the pothole 180 in the captured images and/or video feed 140.

The images and/or video feed 140 so captured are processed to generate steering control commands for each of the variable pitch cameras 110, 111, 112, and 113. The steering control commands are configured to realign the pitch angle of each of the variable pitch camera 110, 111, or 112 for obtaining reliable image reconstruction accuracy. The images of reliable reconstruction accuracy can then be used for controlling the movement of the autonomous vehicle 100. The pitch angle may also be adjusted based on sensory information received from other sensors of the autonomous vehicle 100, such as, a gyroscope, a laser, a radar, etc. The sensory information may also include vehicle speed, camera orientation information, camera position information, traffic information and the like.

Each of the variable pitch cameras 110, 111, 112, and/or 113 capture new images and/or video feed 140 after adjusting their respective pitch angles. The images and/or video feed 140 obtained after adjusting the pitch angle of the variable pitch cameras 110, 111, 112, and/or 113 typically aims at improved image clarity and/or resolution, and if these variables worsen there is really no reason for adjusting the pitch. As image clarity and resolution is improved, the improved data associated with different detection tasks, such as, pothole detection, pedestrian detection, etc., can be used to control the autonomous vehicle 100. The images and/or video feed 140 comprising the improved detected data may be displayed on display screens 130 positioned on a dashboard 120 of the autonomous vehicle 100. The movement of the autonomous vehicle 100 is controlled based on the improved detected data as displayed in FIG. 1.

For example, if the variable pitch camera 110 detects a pedestrian at a distance of 1 meter (m) in the path of the autonomous vehicle 100, the autonomous vehicle 100 is immediately halted to allow the pedestrian to pass through. In another example, the variable pitch camera 111 is configured to receive continuous image feed of the lane 160. When the variable pitch camera 111 detects a deviation at a predefined distance from a lane marking associated with the lane 160, the direction of motion of the autonomous vehicle 100 is redirected towards the lane 160.

Any features of embodiment 10 may be readily combined or permuted with any of the other embodiments 20, 30, 40, 50, 60, 70, 80, 91, 92, 93, 94, 95, and/or 96 in accordance with the invention.

FIG. 2 demonstrates an embodiment 20 of a method for controlling the autonomous vehicle 100 comprising at least one variable pitch camera 110, 111, 112, and/or 113 in accordance with the invention as a flow diagram. The method could be implemented in a system identical or similar to embodiment 10 or 70 in FIG. 1 or 7 for example, as discussed in the other parts of the description. An end-user of the method could use a user interface identical or similar to that disclosed with embodiments 30 and 60 in FIGS. 3 and 6 respectively.

The method for controlling the autonomous vehicle 100 inventively comprises a plurality of variable pitch cameras 110, 111, 112, and/or 113.

In phase 200, a motor of the autonomous vehicle 100 controls at least one variable pitch camera 110, 111, 112, and/or 113 of the autonomous vehicle 100 that has a variable and movable pitch to the direction of travel of the autonomous vehicle 100. If the orientation of the variable pitch camera 110, 111, 112, or 113 is away from the direction of travel, the motor typically dynamically adjusts the pitch to capture images in the direction of travel, or sectors close to it. The motor controlling the movement is typically a small electric motor, separate from the engine of the vehicle. However, the motor may be electrically powered from the vehicle battery. The motor can also be substituted by a magnetic or hydraulic control means used to move the camera in different embodiments of the invention.

In phase 210, the pitch of the variable pitch camera 110, 111, 112, or 113 is changed to maximise the image clarity and/or resolution, as the autonomous vehicle 100 moves. For example, if the autonomous vehicle 100 changes the direction of travel, the pitch of the variable pitch camera 110, 111, 112, or 113 is dynamically adjusted to point towards the travel direction without hampering the clarity of the images. The pitch of the variable pitch camera 110, 111, 112, or 113 may also be adjusted to increase the resolution of image feeds, when the variable pitch camera 110, 111, 112, or 113 produces too coarse images, or to focus the cameras when the images produced are too blurry.

In phase 220, at least one image from the variable pitch camera 110, 111, 112, or 113 is used to control the movement of the autonomous vehicle 100. For example, if the image from the variable pitch camera 110, 111, 112, or 113 indicates a deviation from a lane, the autonomous vehicle 100 is preferably immediately redirected towards the lane to ensure lane keeping.

In phase 230, the variable pitch camera 110, 111, 112, or 113 of the autonomous vehicle 100 may be used, for example, for lane detection, pedestrian detection, 3D reconstruction of the environment, pothole detection and for other accident avoiding activities.

Any features of embodiment 20 may be readily combined or permuted with any of the other embodiments 10, 30, 40, 50, 60, 70, 80, 91, 92, 93, 94, 95, and/or 96 in accordance with the invention.

Figure 3:
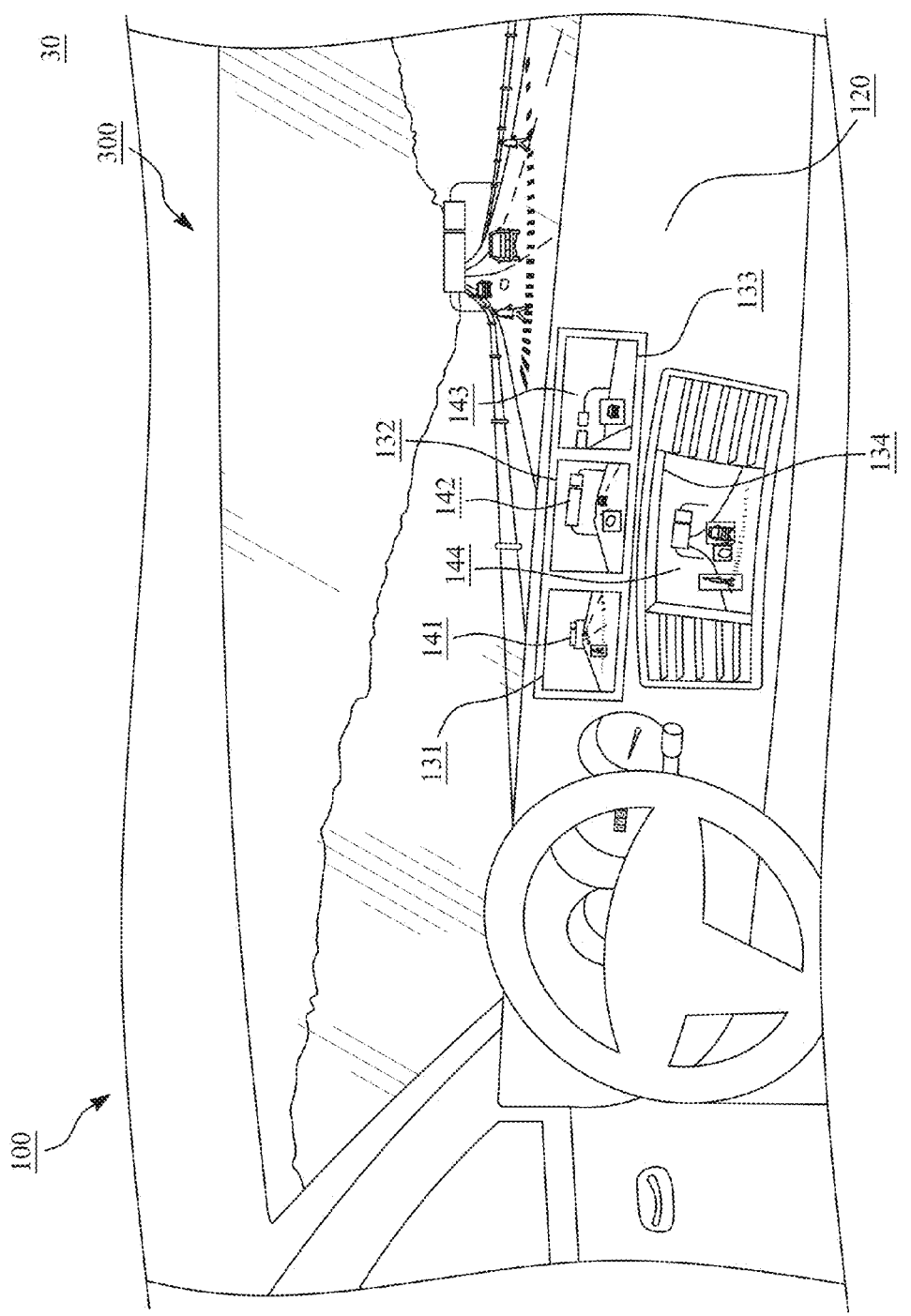
FIG. 3 demonstrates an embodiment 30 of a more elaborate autonomous vehicle with different camera views displayed on a dashboard of the autonomous vehicle in accordance with the invention as a diagram.

FIG. 3 demonstrates an embodiment 30 of a more elaborate autonomous vehicle 100 with different camera views displayed on a dashboard 120 of the autonomous vehicle 100 in accordance with the invention as a diagram. The autonomous vehicle 100 comprises different variable pitch cameras 110, 111, 112, and 113 configured to produce images for a computer vision used to control the autonomous vehicle 100. The variable pitch cameras 110, 111, 112, and 113 have a variable and movable pitch corresponding to the direction of travel that is to be controlled by, preferably a motor, of the autonomous vehicle 100.

As demonstrated in FIG. 3, at least four screens are installed on the dashboard 120. Each screen of the four screens display a live feed of images or video data captured by four different variable pitch cameras 110, 111, 112, and 113 of the autonomous vehicle 100 positioned at different locations and/or orientations. In some embodiments each variable pitch camera 110, 111, 112, and 113 is configured to perform a different task, such as, pothole detection, pedestrian detection, etc., to be completed at a different camera position and/or orientation.

For example, in one embodiment, the user interface 131 displays detected pedestrian image and/or video feed 141 obtained from camera #1 110; the user interface 132 displays detected pothole image and/or video feed 142 from camera #2 111; the user interface 133 displays detected vehicle image and/or video feed 143 indicative of traffic situation from camera #3 112; and the user interface 134 displays detected 3D reconstruction image and/or video feed 144 of the environment from camera #4 113. All of the variable pitch cameras 110, 111, 112, and/or 113 may be positioned on a top surface of the autonomous vehicle 100 facing the direction of motion of the autonomous vehicle 100, but other locations are also possible in some embodiments of the invention.

The pitch of at least one variable pitch camera 110, 111, 112, or 113 from the plurality of variable pitch cameras 110, 111, 112, and 113 is configured to be changed to maximise camera image clarity and/or resolution as the autonomous vehicle 100 moves. The pitch of the at least one variable pitch cameras 110, 111, 112, or 113 is controlled based on, for example, camera position, camera orientation, and/or vehicle speed. The pitch of the variable pitch cameras 110, 111, 112, and/or 113 may also be controlled based on, for example, weather and/or traffic situation. At least one image from the variable pitch cameras 110, 111, 112, and/or 113 is configured to be used in controlling the movement of the autonomous vehicle 100.

Apart from a passenger view 300 of a navigation path via a wind shield of the autonomous vehicle 100, a driver of the autonomous vehicle 100 is provided with a more detailed view of the path ahead via user interfaces 131, 132, 133, and 134. In an example, the driver can control the movement of the autonomous vehicle 100, such as, manoeuvre the autonomous vehicle 100 to avoid the pothole, the vehicle, or the pedestrian on the lane without departing from the lane. In another example, the movement of the autonomous vehicle 100 is independently controlled by a control unit of the autonomous vehicle 100 to avoid the pothole, the vehicle, or the pedestrian on the lane without departing from the lane.

The driver may also set some avoidance or drive control functions to automatic, and some to manual in some embodiments of the invention. For example, the pedestrian avoidance is a high priority and it could be set to automatic, whereas pothole detection is not so relevant as human lives are not at stake so it could be set to manual in some embodiments of the invention.

Any features of embodiment 30 may be readily combined or permuted with any of the other embodiments 10, 20, 40, 50, 60, 70, 80, 91, 92, 93, 94, 95, and/or 96 in accordance with the invention.

Figure 4:
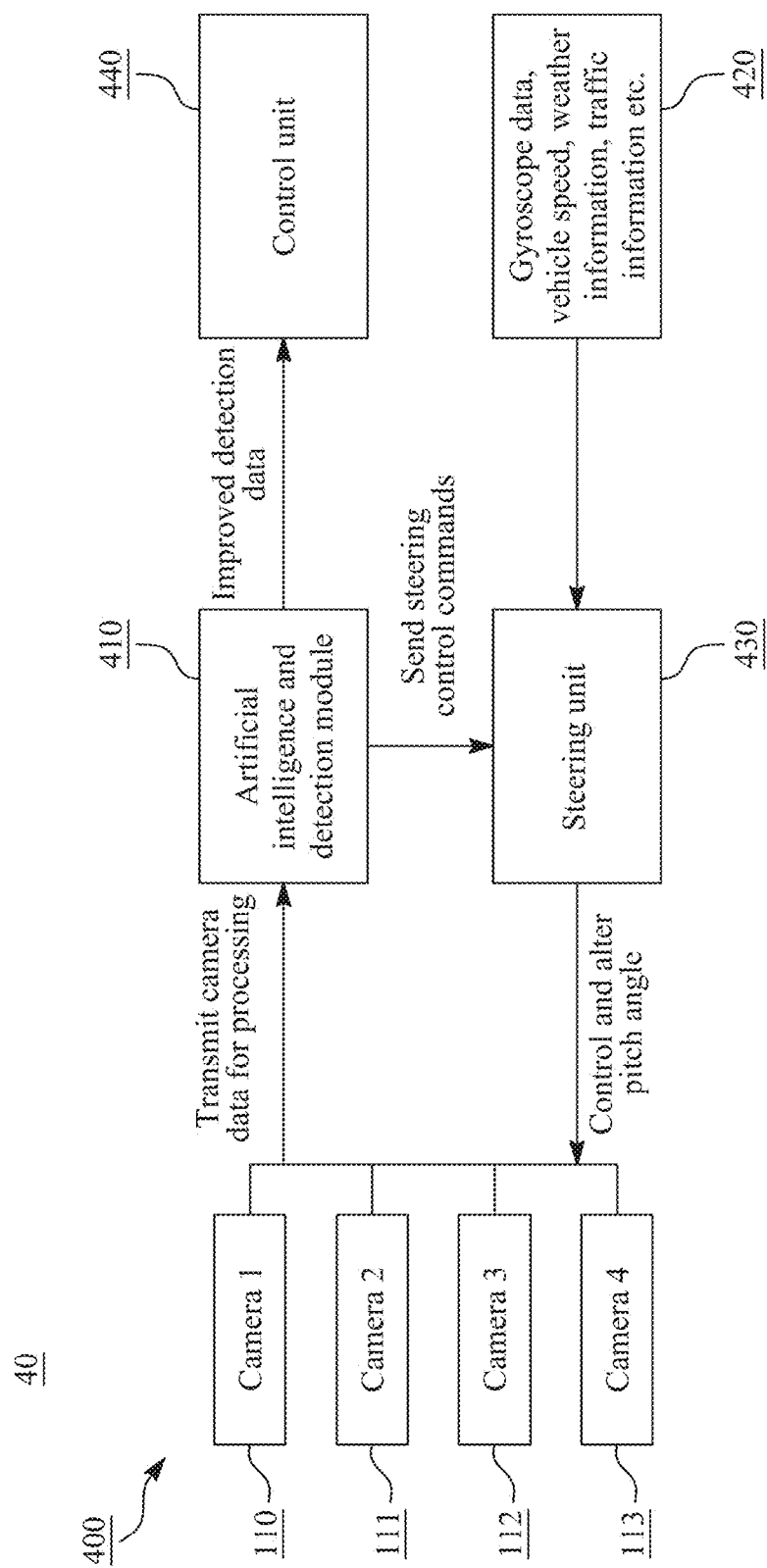
FIG. 4 demonstrates an embodiment 40 of a vehicle camera alignment system in accordance with the invention as a block diagram.

FIG. 4 demonstrates an embodiment 40 of a vehicle camera alignment system 400 in accordance with the invention as a block diagram. The vehicle camera alignment system 400 comprises an artificial intelligence and detection module (AI/DET) module 410, a steering unit 430, and a control unit 440. The autonomous vehicle 100 comprises multiple variable pitch cameras, for example, camera #1 110, camera #2 111, camera #3 112, and camera #4 113. The vehicle camera alignment system 400 residing in the autonomous vehicle 100 is employed for controlling movement of the autonomous vehicle 100 by varying pitch angle of the variable pitch cameras 110, 111, 112, and 113. The variable pitch cameras 110, 111, 112, and/or 113 are operated and controlled by the vehicle camera alignment system 400. The AI/DET module 410 receives camera data from the variable pitch cameras 110, 111, 112, and/or 113. The camera data includes image and/or video feed obtained from the variable pitch cameras 110, 111, 112, and/or 113.

The AI/DET module 410 processes the camera data and sends steering control commands to the steering unit 430. The steering unit 430 also receives additional vehicle-related information 420 comprising gyroscope data, camera position, camera orientation, vehicle speed, weather information, traffic information, etc., from other sensors of the autonomous vehicle 100. The other sensors may comprise, for example, parking sensors, a LIDAR, a radar, a gyroscope, etc. The steering unit 430 controls and alters the pitch angle of the variable pitch cameras 110, 111, 112, and/or 113 based on the steering control commands and the vehicle-related information 420 received from the other sensors. The pitch of the variable pitch cameras 110, 111, 112, and/or 113 is adjusted based on the steering control command to produce improved and reliable detected data that can be used to efficiently and securely control the movement of the autonomous vehicle 100.

Any features of embodiment 40 may be readily combined or permuted with any of the other embodiments 10, 20, 30, 50, 60, 70, 80, 91, 92, 93, 94, 95, and/or 96 in accordance with the invention.

Figure 5:
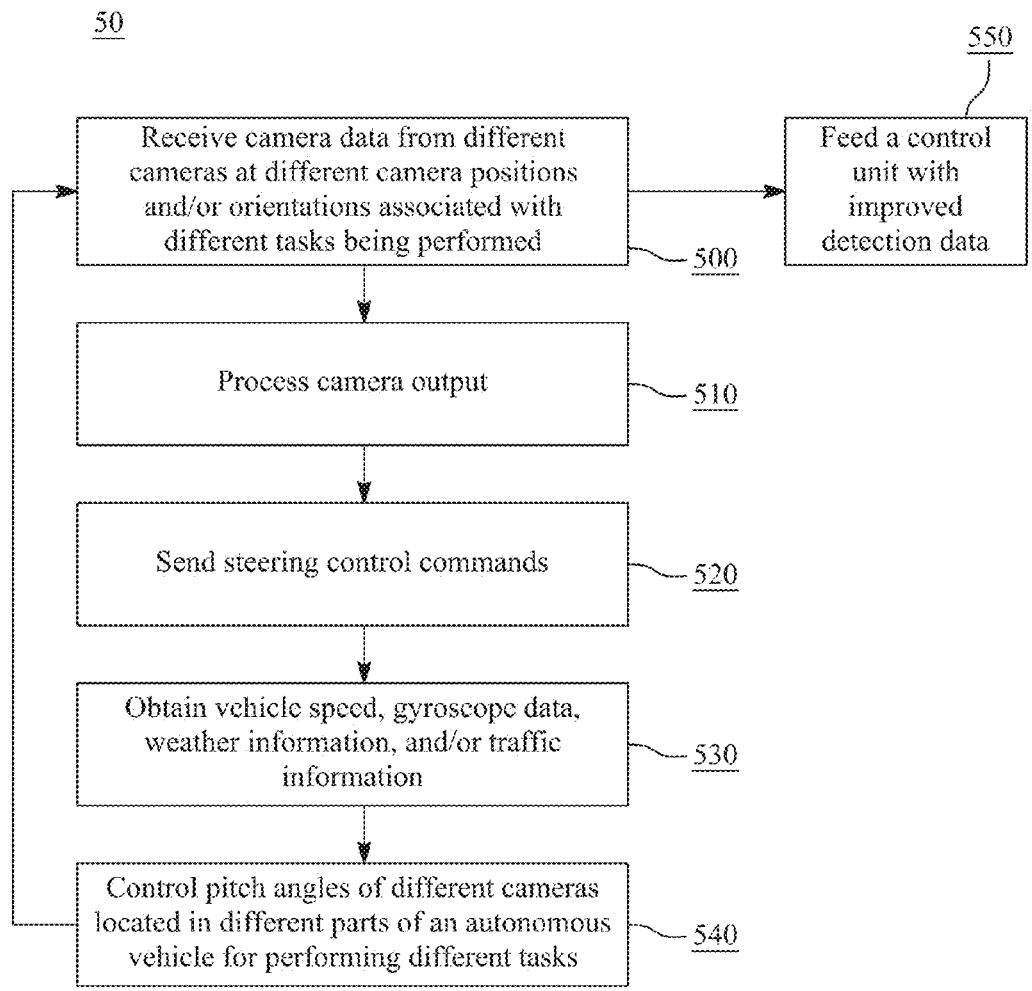
FIG. 5 demonstrates an embodiment 50 of a more elaborate method for controlling the autonomous vehicle comprising at least one variable pitch camera in accordance with the invention as a flow diagram.

FIG. 5 demonstrates an embodiment 50 of a more elaborate method for controlling the autonomous vehicle 100 comprising at least one variable pitch camera 110, 111, 112, or 113 in accordance with the invention as a flow diagram.

In phase 500, camera data comprising images and/or video feed from different variable pitch cameras 110, 111, 112, and/or 113 located at different camera positions and/or orientations is received. The camera data is associated with different tasks, such as, pothole detection, pedestrian detection, etc., to be performed by the autonomous vehicle 100.

In phase 510, the camera data is processed to correct any discrepancies in clarity and/or resolution of the images.

In phase 520, the steering control commands associated with each variable pitch camera 110, 111, 112, and 113 are generated. For example, if the discrepancies are not corrected by processing the camera data, an appropriate pitch angle is determined such that the camera data captured at an adjusted pitch angle is devoid of any discrepancies.

In phase 530, a plurality of vehicle-related information, such as, vehicle speed, gyroscope data, weather information, traffic information, etc., is obtained. The plurality of vehicle-related information is obtained from different sensors employed by the autonomous vehicle 100. A few examples of the sensors include a gyroscope, a radar sensor, a LIDAR sensor, a speedometer, etc.

In phase 540, the pitch angle of each variable pitch camera 110, 111, 112, and 113 is controlled to perform the different tasks, such as, pothole detection, lane detection, pedestrian detection, etc. The pitch angle is adjusted considering the steering control commands and the vehicle-related information to achieve an optimal performance of the tasks to be performed by the autonomous vehicle 100. The pitch angle is adjusted to improve any discrepancies in image clarity and/or resolution of the camera data captured by each variable pitch camera 110, 111, 112, and 113. Each variable pitch camera 110, 111, 112, and 113 at the adjusted pitch angle obtains improved detected data with rectified image clarity and/or resolution that can be used to optimally perform the tasks.

In phase 550, the improved detected data is obtained from the variable pitch cameras 110, 111, 112, and/or 113 after adjusting the pitch of each variable pitch camera 110, 111, 112, and/or 113. The improved camera detected data is fed to the control unit 440 of the autonomous vehicle 100. The control unit 440 is configured to control the movement of the autonomous vehicle 100 based on the improved camera detected data to ensure road safety and vehicle safety, among other purposes. Other purposes include avoid traffic congested areas, detect driver drowsiness, Intelligent Speed Adaptation (ISA) to alert a driver in case of over speeding or dynamically reduce the vehicle speed to bring within an allowable speed limit.

Any features of embodiment 50 may be readily combined or permuted with any of the other embodiments 10, 20, 30, 40, 60, 70, 80, 91, 92, 93, 94, 95, and/or 96 in accordance with the invention.

Figure 6:
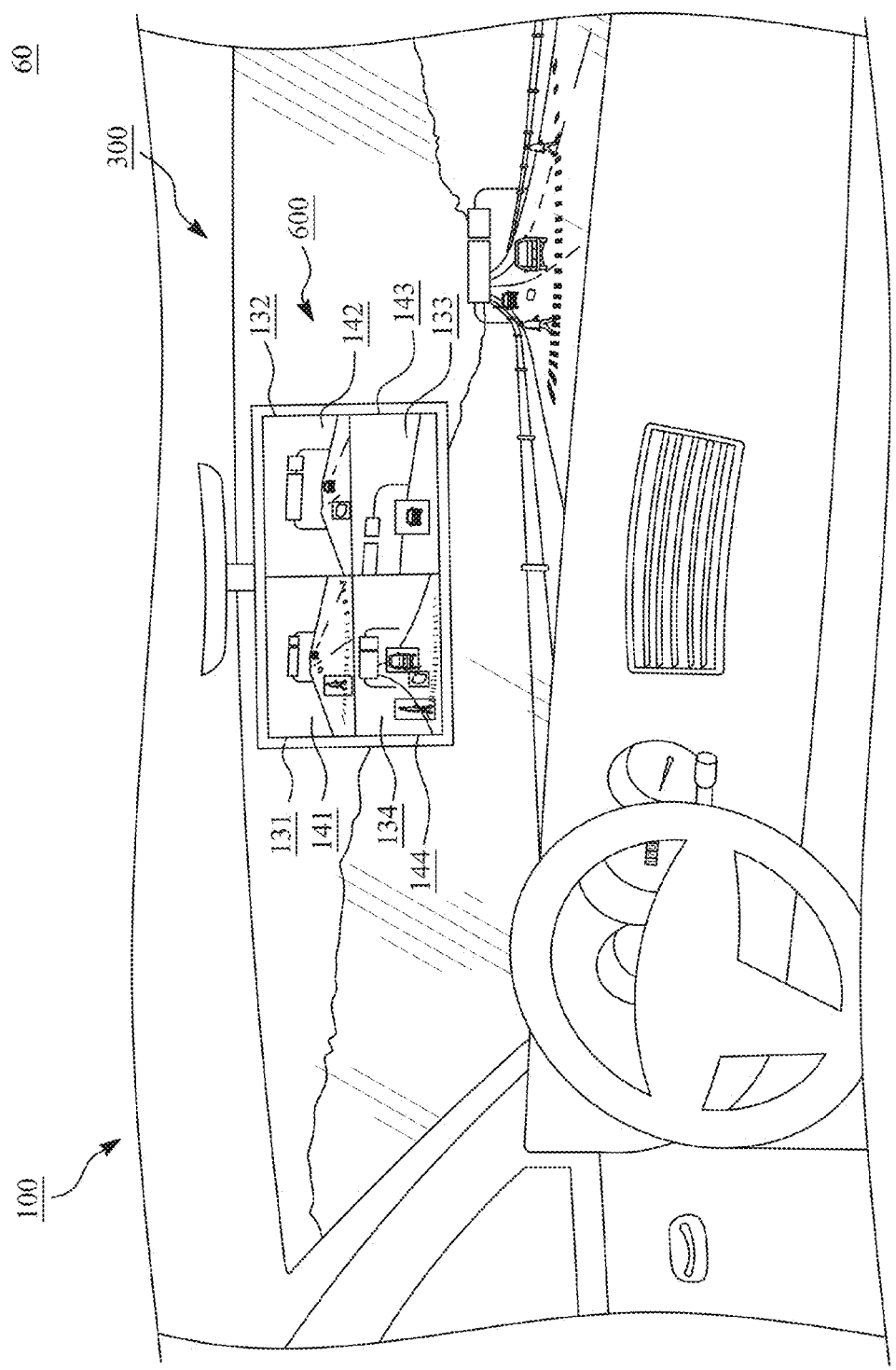
FIG. 6 demonstrates another embodiment 60 of a more elaborate autonomous vehicle with different camera views displayed on an overhead console of the autonomous vehicle in accordance with the invention as a diagram.

FIG. 6 demonstrates another embodiment 60 of a more elaborate autonomous vehicle 100 with different camera views displayed on an overhead console 600 of the autonomous vehicle 100 in accordance with the invention as a diagram. In an example implementation, the different camera views are displayed to a driver of the autonomous vehicle 100 at a different location inside the autonomous vehicle 100 i.e. the overhead console 600, in case the driver prefers to view the camera images along the same line of sight as the passenger view 300. System behind the user interfaces 131, 132, 133, and 134 for displaying pedestrian image and/or video feed 141, pothole image and/or video feed 142, vehicle image and/or video feed 143, and environment image and/or video feed 144 could be, for example, similar to the embodiment 30 explained earlier and is not repeated for the sake of brevity.

In some embodiments the pitch of the variable pitch camera 110, 111, 112 and 113 is controlled based on any of the following: camera position, camera orientation, gyroscope data and/or speed of said vehicle 100. Further, the pitch of the variable pitch camera 110, 111, 112 and 113 may also be controlled based on any of the following: weather, output of the imaging algorithm, mapping info, GPS (Global Positioning System) location and/or traffic situation. The said plurality of cameras 110, 111, 112 and 113 are located in different parts of the autonomous vehicle 100 and are configured to perform different tasks, and thus show different views accordingly on the dashboard 141, 142, 143 and/or 144.

In some embodiments each of the detections tasks is configured to be completed at a different camera position and/or orientation, leading to a different view 141, 142, 143 and/or 144. Further typically, but not necessarily, at least one camera output is configured to be processed by an Artificial Intelligence and detection module 410. The Artificial Intelligence and detection module 410 is configured to send steering control commands to a Steering unit 430, based on the image data it receives and other sensory data that is detected by the other vehicle detection systems. For example, the Steering unit 430 is configured to use vehicle speed and/or gyroscope data to control and alter the pitch angle of at least one said camera 110, 111, 112, and/or 113, thereby changing the pictures in the views 141, 142, 143 and/or 144.

In some embodiments the Steering unit 430 is configured to use vehicle speed and/or gyroscope data to control and alter the pitch angle of at least one said camera 110, 111, 112, or 113 repeatedly in a closed loop, and optionally the improved detection performance is configured to be used to feed the control logic of the autonomous vehicle 100. This will show on the dashboard and screens 141, 142, 143 and/or 144, so that the screens are always searching and adjusting to produce a very clear and high resolution picture.

Any features of embodiment 60 may be readily combined or permuted with any of the other embodiments 10, 20, 30, 40, 50, 70, 80, 91, 92, 93, 94, 95, and/or 96 in accordance with the invention.

Figure 7:
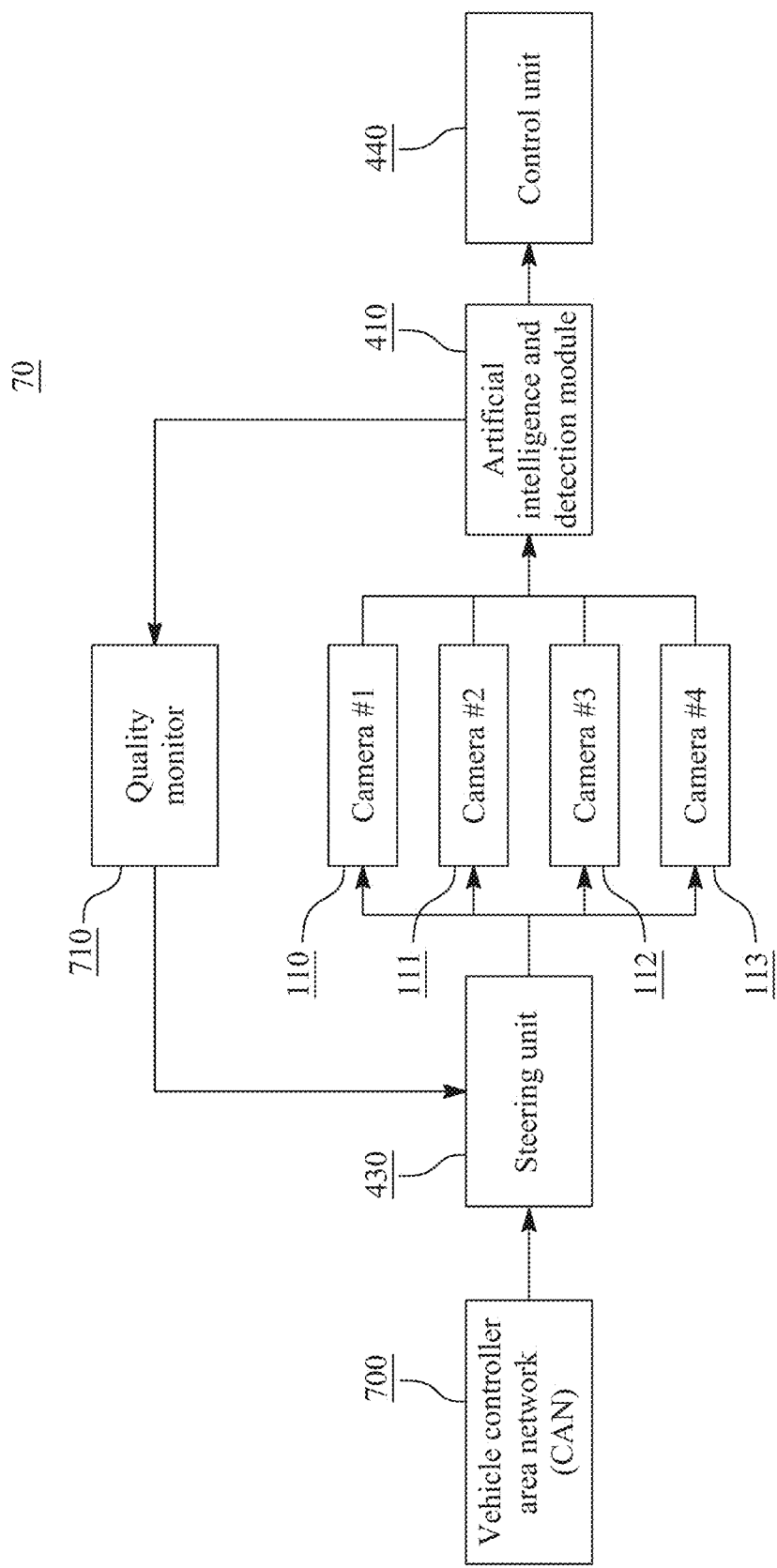
FIG. 7 demonstrates an embodiment 70 of the operation principle of the vehicle camera alignment system in accordance with the invention as a schematic diagram.

FIG. 7 demonstrates an embodiment 70 of an operation principle of the vehicle camera alignment system 400 as a schematic diagram, relating to an experiment showing the functioning of the invention. FIG. 7 demonstrates the embodiment 70 of a software program product for controlling the autonomous vehicle 100. The software program product is stored on a non-transient memory medium either on the autonomous vehicle 100 or on a network host, or distributed between the two, so that some parts reside on the autonomous vehicle 100 and some parts of the software program product reside on the network host. The network used for communication between the autonomous vehicle 100 and the network host in the invention is the wireless Internet or the telephony network, which is typically a cellular network such as UMTS—(Universal Mobile Telecommunication System), GSM—(Global System for Mobile Telecommunications), GPRS—(General Packet Radio Service), CDMA—(Code Division Multiple Access), 3G-, 4G-, Wi-Fi and/or WCDMA (Wideband Code Division Multiple Access)-network. The software program product comprises camera software configured to produce images for a computer vision used to control the autonomous vehicle 100.

The autonomous vehicle 100 is equipped with several variable pitch cameras, for example, camera #1 110, camera #2 111, camera #3 112, camera #4 113, etc., located in different parts of the autonomous vehicle 100 and each performing different tasks, such as, lane detection, pedestrian detection, pothole detection, environment detection, etc. The variable pitch camera 110, 111, 112, or 113 have a variable and movable pitch to a direction of travel that is configured to be controlled by a motor of the autonomous vehicle 100. The autonomous vehicle 100 comprises a steering unit 430, an artificial intelligence (AI) and detection (DET) module 410, and a quality monitor (QM) module 710.

The AI/DET module 410 receives and processes camera inputs received from the variable pitch cameras 110, 111, 112, and/or 113. The AI/DET module 410 sends the processed camera images to the QM module 710. The QM module 710 checks quality of the processed camera inputs and generates camera alignment modification requests based on the processed camera images. The QM module 710 sends the camera alignment modification requests to the steering unit 430. A controller area network (CAN) bus 700 of the autonomous vehicle 100 provides information, such as, vehicle speed, gyroscope data, weather information, traffic information, output of the imaging algorithm, mapping info, GPS etc., obtained from different sensors of the autonomous vehicle 100 to the steering unit 430. The gyroscope data may comprise, for example, camera position and/or camera orientation.

In response to the camera alignment modification request from the QM module 710, the steering unit 430 sets an optimal camera angle for each variable pitch camera 110, 111, 112, and 113 of the autonomous vehicle 100 based on the information received from the CAN bus 700. The steering unit 430 changes the pitch of at least one variable pitch camera 110, 111, 112, or 113 to maximise camera image clarity and/or resolution as the autonomous vehicle 100 moves. In some embodiments, the steering unit 430 may set different optimal camera angles for the different variable pitch 110, 111, 112, and/or 113 of the autonomous vehicle 100. The operation principle of the vehicle camera alignment system 400 is repeated in a closed loop for obtaining optimal detection performance of the variable pitch cameras 110, 111, 112, and/or 113. The detection performed by the variable pitch cameras 110, 111, 112, and/or 113 is optimal when the camera data comprising image and/or video feeds has high image clarity and/or resolution. The optimal detected data is fed to a control unit 440. The control unit 440 uses at least one image from the variable pitch cameras 110, 111, 112, and/or 113 in controlling the movement of the autonomous vehicle 100.

In an embodiment, the autonomous vehicle 100 is configured to have an application installed in a memory that allows the driver or the operator of the autonomous vehicle 100 to select a navigation path or control the movement of the autonomous vehicle 100, based on the detection data provided by the vehicle camera alignment system 400. The application is accessible to the driver via a user interface displayed, for example, on multiple dashboard screens as explained in the embodiment 30 or on multiple overhead console screens as explained in the embodiment 60. The control unit 440 dynamically displays the detected data on the user interfaces to the driver to guide the driver in controlling the movement of the autonomous vehicle 100. The user interfaces may be provided as touch sensitive interfaces that allow the driver to manage the display of the detected data, such as, expand a view, minimize the view, rotate the view, etc.

Any features of embodiment 70 may be readily combined or permuted with any of the other embodiments 10, 20, 30, 40, 50, 60, 80, 91, 92, 93, 94, 95, and/or 96 in accordance with the invention.

Figure 8:
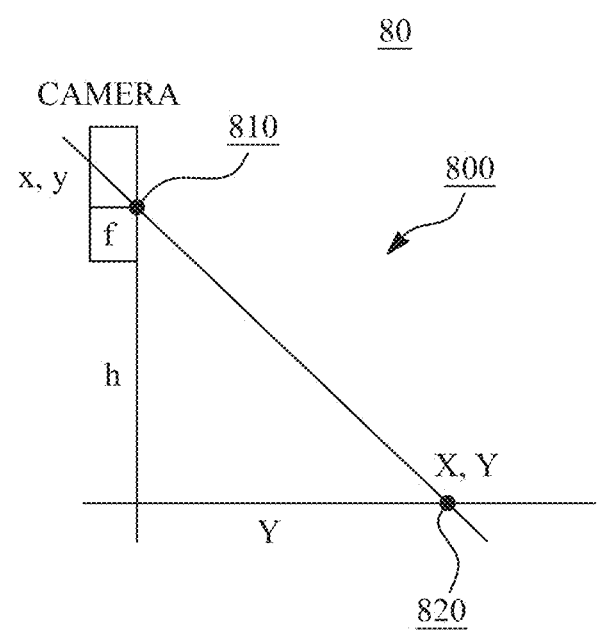
FIG. 8 demonstrates an embodiment 80 of a pinhole camera model relating to an experiment showing the functioning of the invention.

FIG. 8 demonstrates an embodiment 80 of a pinhole camera model relating to an experiment showing the functioning of the invention.

A coordinate system representation 800 demonstrated in FIG. 8 is a right handed coordinate system. The pinhole camera is horizontally aligned with respect to a 3D point (X, Y, Z) 820. The coordinates of the 3D point 820 are (X, Y, Z). The camera is positioned at a height of "h" meters above a ground surface. "f" denotes a focal length of the pinhole camera in pixels. (x, y) are the coordinates 810 of the image pixel of the 3D point (X, Y, Z) 820, produced by the pinhole camera. The (x, y) coordinates 810 of the camera's principal point is represented in pixels as ($p_x$, $p_y$). An image sensor of the pinhole camera is centered in an optical axis of camera lenses; hence, the value of $p_x$, $p_y$ is substituted with zero. The camera has a zero pitch angle. The relation between the image coordinates (x, y) 810 and the 3D point coordinates (X, Y, Z) 820 of the object lying on the plane surface in front of a car can be expressed by the following equations:

$$\frac{f}{p_y - y} = \frac{Y}{h} \quad \text{Equation (1)}$$

$$\frac{f}{p_x - x} = \frac{Y}{X} \quad \text{Equation (2)}$$

When one of the variable pitch cameras 110, 111, 112, or 113 mounted on the autonomous vehicle 100 in FIG. 1, has a non-zero pitch angle, then the relation between the image coordinates (x, y) 810 and the 3D point coordinates (X, Y) 820 of the object is expressed by the following equations:

$$\frac{h}{Y} = \frac{\tan(\iota) + \frac{p_y - y}{f}}{1 + \tan(\iota)\frac{p_y - y}{f}} \quad \text{Equation (3)}$$

$$\frac{p_x - x}{X} = \frac{p_y - y}{h}\left(\sin(\iota)\frac{f}{p_y - y} + \cos(\iota)\right) \quad \text{Equation (4)}$$

Where t is the pitch angle of the variable pitch camera 110, 111, 112, or 113 counted clockwise from the horizontal axis.

Any features of embodiment 80 may be readily combined or permuted with any of the other embodiments 10, 20, 30, 40, 50, 60, 70, 91, 92, 93, 94, 95, and/or 96 in accordance with the invention.

Figure 9A:
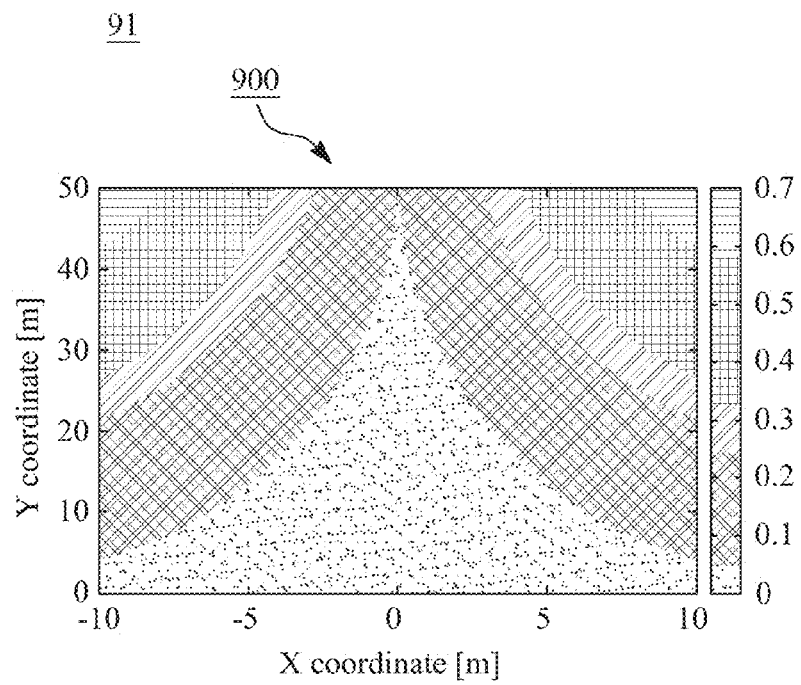
FIG. 9(A) demonstrates an embodiment 91 of a graphical representation of a distribution of absolute errors (in meters) of X coordinate reconstruction in case of a horizontally aligned camera relating to an experiment showing the functioning of the invention.

FIG. 9(A) demonstrates an embodiment 91 of a graphical representation 900 of a distribution of absolute errors (in meters) of X coordinate reconstruction in case of the horizontally aligned camera relating to an experiment showing the functioning of the invention. Bear in mind that the image sensor of the pinhole camera is still centered in an optical axis of camera lenses; hence, the value of $p_x$, $p_y$ is substituted with zero.

The relation of a position reconstruction error (ΔX) associated with the X coordinate can be represented by the following equation:

$$\Delta X = \frac{Y}{f} + \frac{XY}{hf}; \delta X = \frac{Y}{fX} + \frac{Y}{hf} \quad \text{Equation (5)}$$

The relation distribution of the absolute errors (in meters) of the X coordinate reconstruction in case of the variable pitch camera 110, 111, 112, or 113 mounted on the autonomous vehicle 100 in FIG. 1, can be represented by the following equation:

$$(\Delta X(X, Y, \iota))^2 = \left(\frac{1}{f}\frac{h}{\sin(\iota) + \frac{h - Y \cdot \tan(\iota)}{Y - h \cdot \tan(\iota)} \cdot \cos(\iota)}\right)^2 + \quad \text{Equation (6)}$$

$$\left(\frac{1}{f}\frac{X}{\tan(\iota) + \frac{h - Y\tan(\iota)}{Y - h\tan(\iota)}}\right)^2$$

Figure 9B:
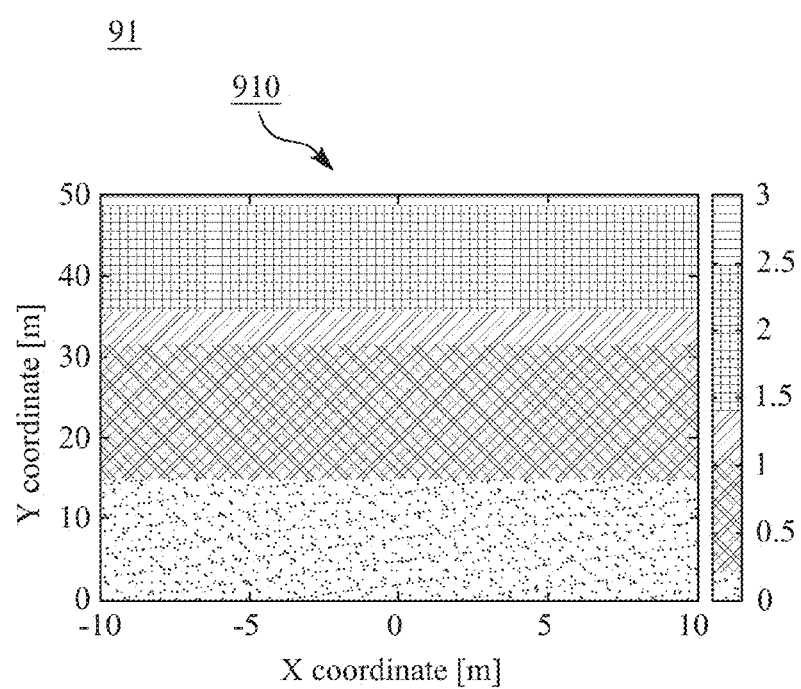
FIG. 9(B) demonstrates an embodiment 91 of a graphical representation of a distribution of absolute errors (in meters) of Y coordinate reconstruction in case of the horizontally aligned camera relating to the experiment showing the functioning of the invention.

FIG. 9(B) demonstrates an embodiment 91 of a graphical representation 910 of a distribution of absolute errors (in meters) of Y coordinate reconstruction in case of the horizontally aligned camera relating to the experiment showing the functioning of the invention.

The relation of a position reconstruction error (ΔY) associated with the Y coordinate can be represented by the following equation:

$$\Delta Y = \frac{Y^2}{fh}; \delta Y = \frac{Y}{fh} \quad \text{Equation (7)}$$

The relation distribution of the absolute errors (in meters) of the Y coordinate reconstruction in case of the variable pitch camera 110, 111, 112, or 113 mounted on the autonomous vehicle 100 can be represented by the following equation:

$$(\Delta Y(Y, \iota)) = \quad \text{Equation (8)}$$

$$\left(\frac{h}{f}\frac{\tan(\iota)}{\tan(\iota) + \frac{h - Y \cdot \tan(\iota)}{Y - h \cdot \tan(\iota)}}\right)^2 - \left(\frac{h}{f}\frac{1 + \tan(\iota)\frac{h - Y\tan(\iota)}{Y - h\tan(\iota)}}{\left(\tan(\iota) + \frac{h - Y\tan(\iota)}{Y - h\tan(\iota)}\right)^2}\right)^2$$

Any features of embodiment 91 may be readily combined or permuted with any of the other embodiments 10, 20, 30, 40, 50, 60, 70, 80, 92, 93, 94, 95, and/or 96 in accordance with the invention.

Figure 10A:
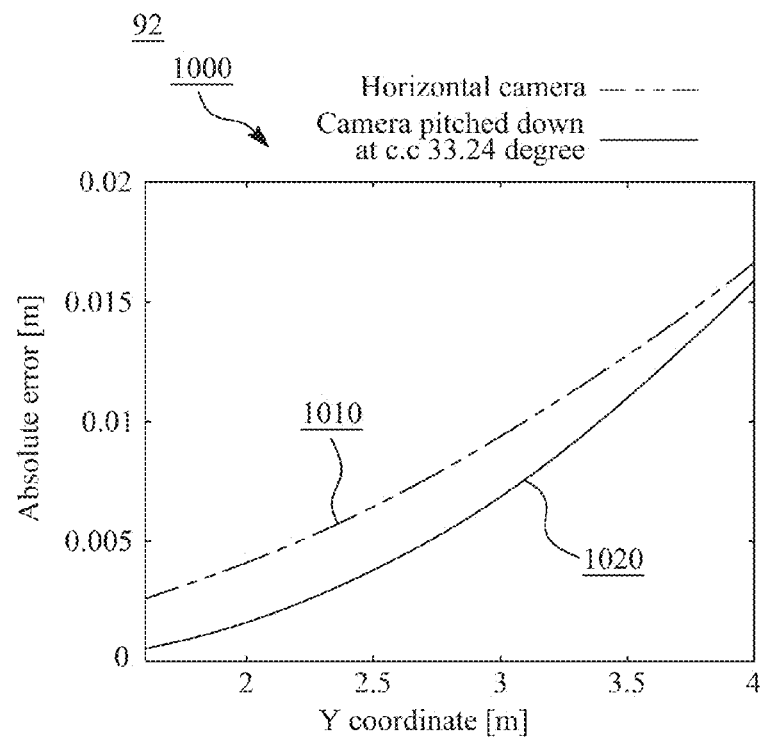
FIG. 10(A) demonstrates an embodiment 92 of a graphical representation of an absolute error comparison of Y coordinate reconstruction in case of a horizontally aligned camera and a variable pitch camera, relating to an experiment showing the functioning of the invention.

FIG. 10(A) demonstrates an embodiment 92 of a graphical representation 1000 of an absolute error comparison of the Y coordinate reconstruction in case of the horizontally aligned camera and the variable pitch camera 110, 111, 112, or 113, relating to an experiment showing the functioning of the invention. The curve 1010 demonstrates the absolute error associated with the horizontally aligned camera and the curve 1020 demonstrates the absolute error associated with the variable pitch camera 110, 111, 112, or 113.

Figure 10B:
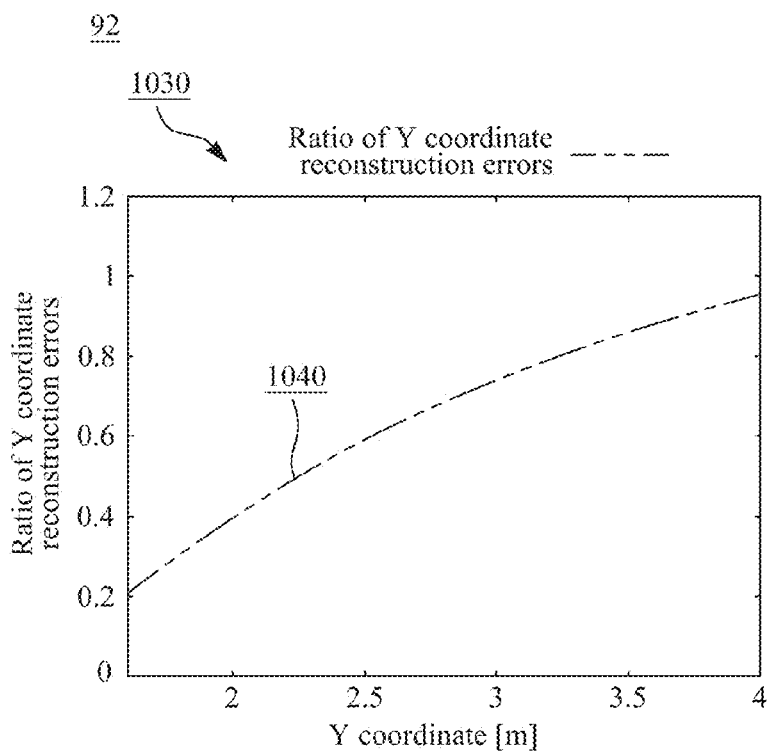
FIG. 10(B) demonstrates an embodiment 92 of a graphical representation of an evaluation of reconstruction performance by ratio calculation of absolute errors, relating to the experiment showing the functioning of the invention.

FIG. 10(B) demonstrates an embodiment 92 of a graphical representation 1030 of an evaluation of reconstruction performance by ratio calculation of the absolute errors, relating to the experiment showing the functioning of the invention. The curve 1040 demonstrates a ratio of the Y coordinate reconstruction errors.

Quite clearly the experiment shows that the pitch of the camera reduces the reconstruction errors in the whole range of the Y-co-ordinate, and even more so at short distances.

Any features of embodiment 92 may be readily combined or permuted with any of the other embodiments 10, 20, 30, 40, 50, 60, 70, 80, 91, 93, 94, 95, and/or 96 in accordance with the invention.

Figure 11A:
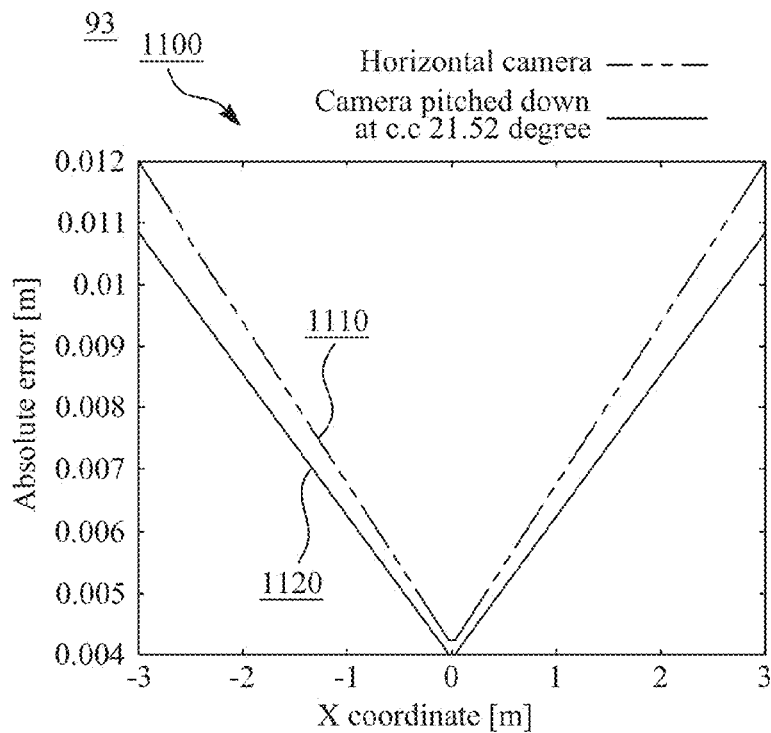
FIG. 11(A) demonstrates an embodiment 93 of a graphical representation of absolute error calculation of X coordinate reconstruction in case of the horizontally aligned camera and the variable pitch camera, relating to an experiment showing the functioning of the invention.

FIG. 11(A) demonstrates an embodiment 93 of a graphical representation 1100 of the absolute error calculation of the X coordinate reconstruction in case of the horizontally aligned camera and the variable pitch camera 110, 111, 112, or 113, relating to an experiment showing the functioning of the invention. The curve 1110 demonstrates the absolute error associated with the horizontally aligned camera, and the curve 1120 demonstrates the absolute error associated with the variable pitch camera 110, 111, 112, or 113.

Figure 11B:
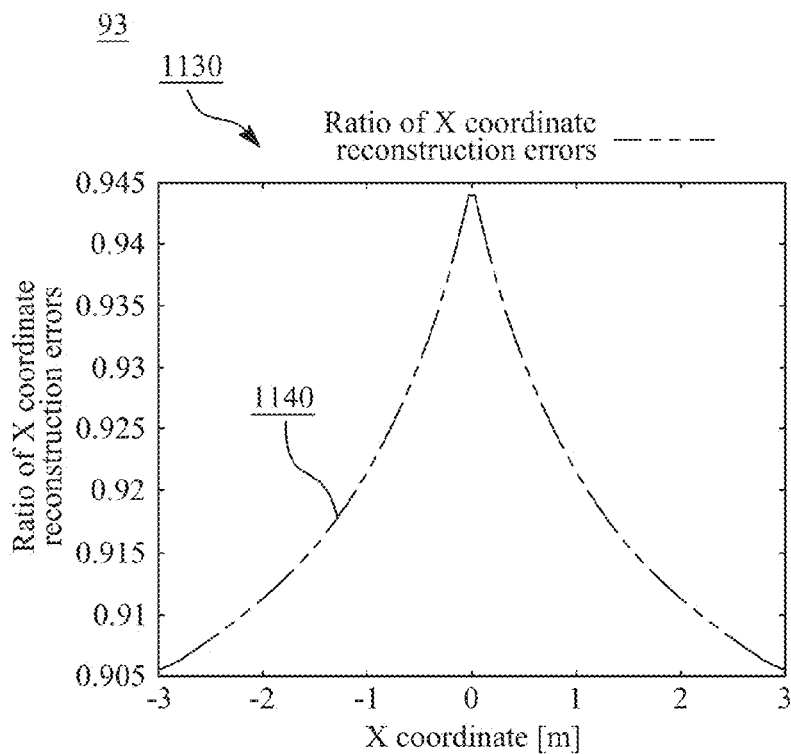
FIG. 11(B) demonstrates an embodiment 93 of a graphical representation of an evaluation of reconstruction performance by ratio calculation of absolute errors, relating to the experiment showing the functioning of the invention.

FIG. 11(B) demonstrates an embodiment 93 of a graphical representation 1130 of an evaluation of the reconstruction performance by ratio calculation of the absolute errors, relating to the experiment showing the functioning of the invention. The curve 1140 demonstrates a ratio of the X coordinate reconstruction errors.

Quite clearly the experiment shows that the pitch of the camera reduces the reconstruction errors in the whole range of the X-co-ordinate, and even more so as we approach 3 meters in the X-co-ordinate.

Any features of embodiment 93 may be readily combined or permuted with any of the other embodiments 10, 20, 30, 40, 50, 60, 70, 80, 91, 92, 94, 95, and/or 96 in accordance with the invention.

Figure 12A:
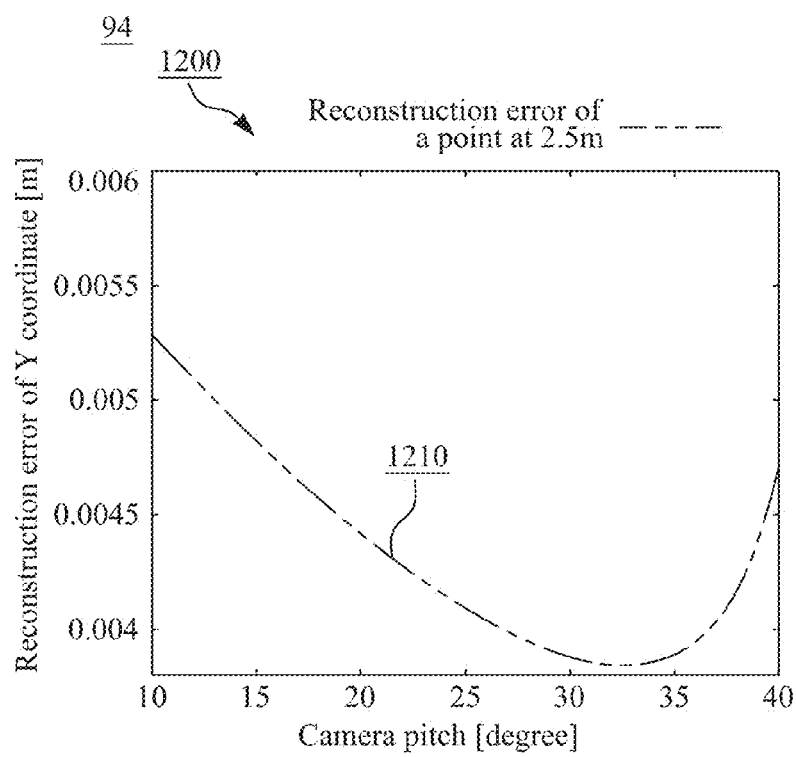
FIG. 12(A) demonstrates an embodiment 94 of a graphical representation of a variation of reconstruction accuracy as a function of the camera pitch angle in the case of Y coordinate reconstruction for a point at 2.5 meters ahead of the variable pitch camera at a height of 1.6 m, relating to an experiment showing the functioning of the invention.

FIG. 12(A) demonstrates an embodiment 94 of a graphical representation 1200 of a variation of position reconstruction accuracy as a function of the camera pitch angle in the case of a Y coordinate reconstruction for a point 2.5 meters ahead of the variable pitch camera 110, 111, 112, or 113 at a height of 1.6 m, relating to an experiment showing the functioning of the invention. The graphical representation 1200 demonstrates how the reconstruction accuracy is dependent on the camera pitch angle of the variable pitch camera 110, 111, 112, or 113. In an example, a high sensitivity of the position reconstruction accuracy can be achieved when the camera optical center is directly pointing towards the point in question, i.e., the camera pitch t=tan(1.6/2.5)=32.6°. The curve 1210 demonstrates the reconstruction error associated with the variable pitch camera 110, 111, 112, or 113 at the distance of 2.5 m.

Figure 12B:
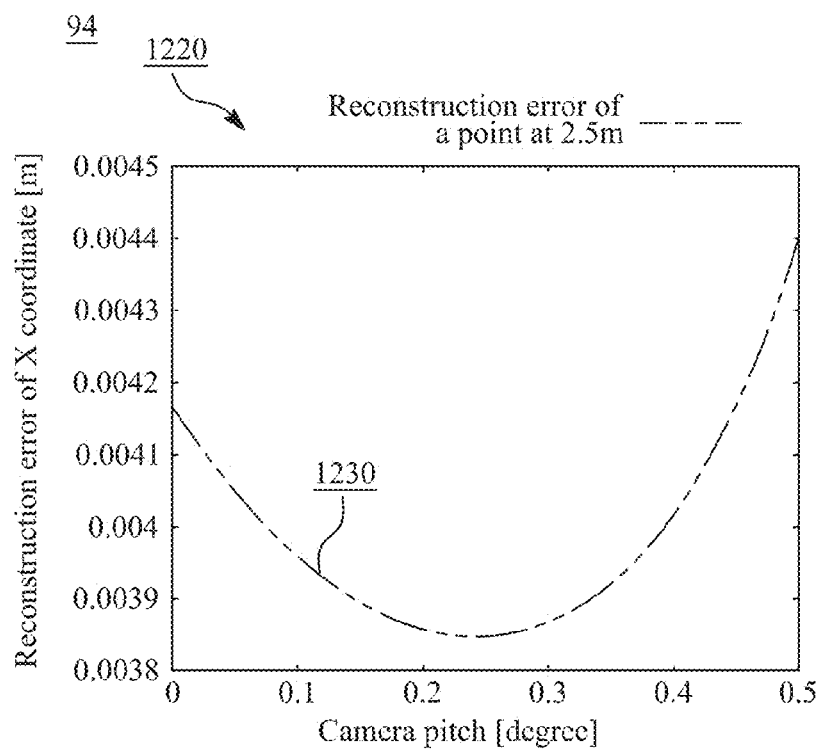
FIG. 12(B) demonstrates an embodiment 94 of a graphical representation of a variation of position reconstruction accuracy as a function of the camera pitch angle in the case of X coordinate reconstruction for the point 2.5 meters ahead of the variable pitch camera at the height of 1.6 m, relating to the experiment showing the functioning of the invention.

FIG. 12(B) demonstrates an embodiment 94 of a graphical representation 1220 of a variation of the position reconstruction accuracy as a function of the camera pitch angle in the case of the X coordinate reconstruction for the point 2.5 meters ahead of the variable pitch camera 110, 111, 112, or 113 at the height of 1.6 m, relating to the experiment showing the functioning of the invention. The curve 1230 represents the reconstruction error associated with the variable pitch camera 110, 111, 112, or 113 at the distance of 2.5 m.

The experiment clearly shows, that for example the detection of the head/shoulder of an average pedestrian at height 1.6m is best achieved with a camera pitch of 30-35 degrees. Therefore, in preferable embodiments of the invention if the vehicle detects that it is in an area where pedestrians are likely to occur, it will alter the pitch of the at least one camera to 30-35 degrees, and provide this camera with an override capability over anything else, allowing the detection of a pedestrian by this camera to e.g. stop the vehicle regardless of what other detectors detect.

Any features of embodiment 94 may be readily combined or permuted with any of the other embodiments 10, 20, 30, 40, 50, 60, 70, 80, 91, 92, 93, 95, and/or 96 in accordance with the invention.

Now let's look at how the vehicle detects lane markings. In order to be able to calculate the optimal trajectory for the autonomous vehicle it must detect a specific length (l) of lane markings ahead of the vehicle with the highest possible precision. The measure of this detection precision (error, E) can be naturally defined as the following:

$$E = \int_0^l I(\Delta X(X,Y,h,f), \Delta Y(X,Y,f,h)) dl \quad \text{Equation (9)}$$

where ΔX and ΔY are position reconstruction errors as in Equations 5-8, l is the distance measured from the camera, while I(l) is the importance function specific to the control and trajectory mechanism taking into account the fact the weight of lane marking points lying further from the camera is different from the closer ones.

For an educated estimate of the upper integration limit we can take into the account the fact that highways and roads are constructed in a way that no significant/dangerous change in curvature/quality can happen within the reaction time ($t_r$) of human drivers at a given (allowed) cruising speed (v). For a conservative estimate of reaction time let's choose $t_r$=1.0 s:

$$l = v \times t_r \quad \text{Equation (10)}$$

The integral in Equation [9] can easily be calculated numerically for different regions of the parameter space. The goal of this section is to determine optimal camera pitch which minimizes E at a specific cruising speed v.

Figure 13A:
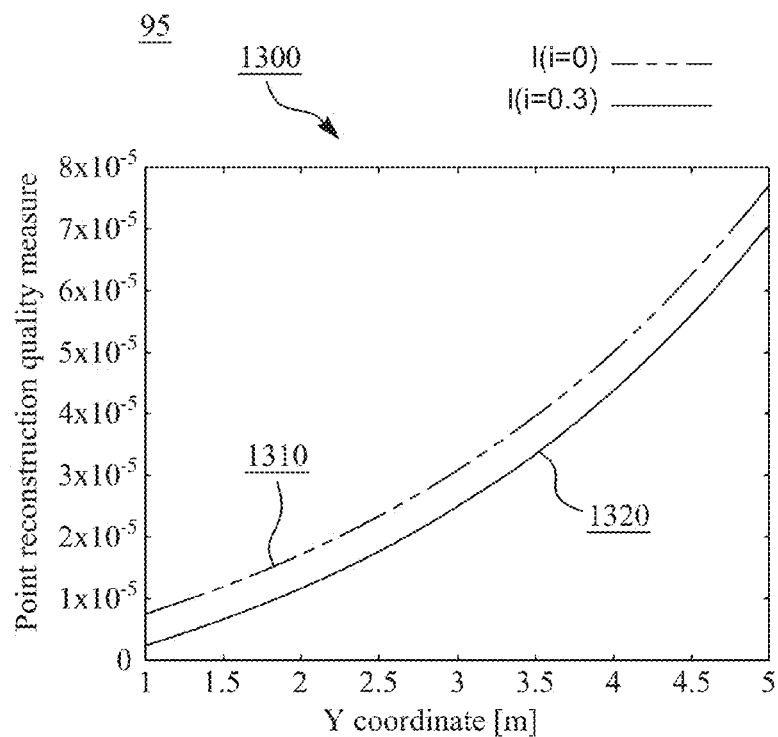
FIG. 13(A) demonstrates an embodiment 95 of a graphical representation of a lane marking position reconstruction quality measure as a function of y coordinate at x=−1.5 meters for the horizontally aligned camera and the variable pitch camera, relating to an experiment showing the functioning of the invention.

FIG. 13(A) demonstrates an embodiment 95 of a graphical representation 1300 of a lane marking position reconstruction quality measure as a function of y coordinate at x=−1.5 meters for the horizontally aligned camera and the variable pitch camera 110, 111, 112, or 113, relating to an experiment showing the functioning of the invention. The curve 1310 demonstrates the lane marking position reconstruction accuracy measure for the horizontally aligned camera, and the curve 1320 demonstrates the lane marking position reconstruction accuracy measure for the variable pitch camera 110, 111, 112, or 113. This embodiment 95 explains the relation between vehicle speed and an optimal camera pitch. For calculating measurement precision in lane marking reconstruction, transverse direction of vehicle movement and 3D points proximal to the autonomous vehicle 100 at a given time are considered. An importance function (I) that specifies a control and trajectory mechanism based on a weight of lane marking points lying farther from the variable pitch camera 110, 111, 112, or 113 that is different from the closer ones is expressed by the equation given below:

$$I(\Delta X(X,Y,h,f), \Delta Y(X,Y,f,h)) = (0.7 \cdot (\Delta X)^2 + 0.3 \cdot (\Delta Y)^2) \cdot \frac{1}{Y} \quad \text{Equation (11)}$$

The FIG. 13(A) demonstrates an evolution of the integral of the equation [11] as a function of the distance ahead of the autonomous vehicle 100 for a typical lane detection situation, where the lanes are located at the distance of about −1.5 m from a left side and a right side of a center of the autonomous vehicle 100.

Figure 13B:
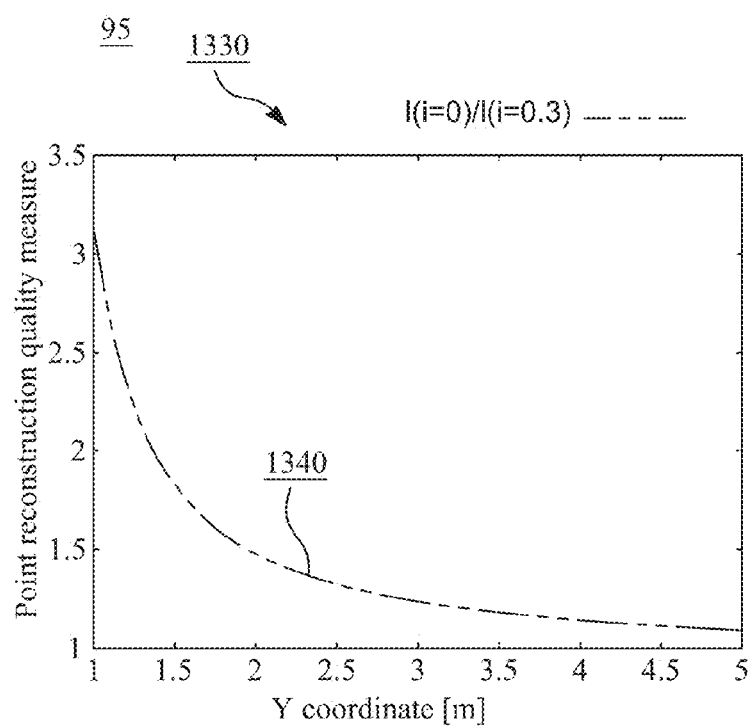
FIG. 13(B) demonstrates an embodiment 95 of a graphical representation of ratio calculation of quality measures for the variable pitch camera and a horizontally aligned camera, relating to an experiment showing the functioning of the invention.

FIG. 13(B) demonstrates an embodiment 95 of a graphical representation 1330 of ratio calculation of quality measures for the variable pitch and the horizontally aligned cameras, relating to an experiment showing the functioning of the invention. The plot demonstrated in FIG. 13(B) depicts selection of a camera pitch angle which results in improved lane marking position reconstruction measure (I). As analyzed in this experiment, the differences between the quality measure for the variable pitch camera 110, 111, 112, or 113 and the horizontally aligned camera can be as high as 300% at very close distances. The curve 1340 demonstrates a ratio of the lane marking position reconstruction accuracy measure of the horizontally aligned camera to the lane marking position reconstruction accuracy measure of the variable pitch camera 110, 111, 112, or 113.

Therefore, the experiment shows that it would be beneficial to have at least one camera pitched to observe the lane markings at short distance, as these have the greatest relative weight among lane measurements when trajectory control is implemented in accordance with the invention.

Any features of embodiment 95 may be readily combined or permuted with any of the other embodiments 10, 20, 30, 40, 50, 60, 70, 80, 91, 92, 93, 94, and/or 96 in accordance with the invention.

Figure 14:
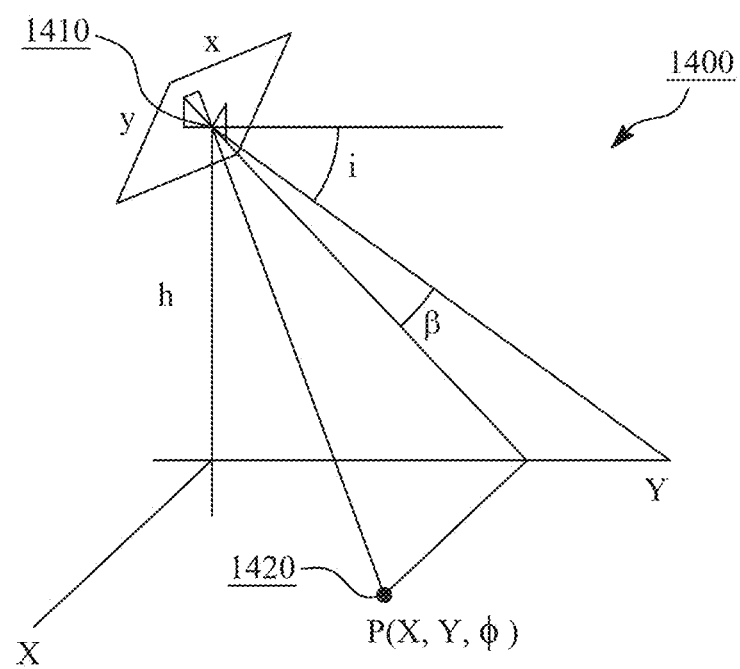
FIG. 14 demonstrates an embodiment 96 of a graphical representation of reconstruction error calculation of a pinhole camera model having a non-zero pitch, relating to an experiment showing the functioning of the invention.

FIG. 14 demonstrates an embodiment 96 of a graphical representation 1400 of a reconstruction error calculation of the pinhole camera model having a non-zero pitch, relating to an experiment showing the functioning of the invention. The reconstruction error calculation is performed with reference to an image pixel coordinate (x, y) 1410 and a 3D point coordinate (X, Y, φ) 1420.

The relation between the Y coordinate and height of the pinhole camera from a surface is as given below:

$$Y = \frac{hf + \tan(\iota) y h}{f \tan(\iota) + y} \quad \text{Equation (12)}$$

Equation 12 discloses that the Y coordinate measurement depends on the y image coordinate and the pitch angle.

The precision of the Y coordinate measurement is given by the equation below:

$$\Delta Y(y, \iota) = \frac{h}{f} \frac{\tan(\iota)}{\tan(\iota) + \frac{h - Y \cdot \tan(\iota)}{Y - h \cdot \tan(\iota)}} - \frac{h}{f} \frac{1 + \tan(\iota) \frac{h - Y \cdot \tan(\iota)}{Y - h \cdot \tan(\iota)}}{\left(\tan(\iota) + \frac{h - Y \cdot \tan(\iota)}{Y - h \cdot \tan(\iota)}\right)^2} \quad \text{Equation (13)}$$

The relation between the X coordinate and the height of the pinhole camera from the plane surface is as given below:

$$X = \frac{xh}{f \cdot \sin(\iota) + y \cdot \cos(\iota)} \quad \text{Equation (14)}$$

Equation 14 discloses that the Y coordinate measurement depends on the x and y image coordinates and the pitch angle.

The precision of the X coordinate measurement is given by the equation below:

$$(\Delta X(x, y, \iota))^2 = \left(\frac{h}{f \cdot \sin(\iota) + y \cdot \cos(\iota)} \Delta x\right)^2 + \left(\frac{hx}{f \cdot \sin(\iota) + y \cdot (\cos(\iota))^2} \cos(\iota) \Delta y\right)^2 \quad \text{Equation (15)}$$

Any features of embodiment 96 may be readily combined or permuted with any of the other embodiments 10, 20, 30, 40, 50, 60, 70, 80, 91, 92, 93, 94, and/or 95 in accordance with the invention.

In all embodiments the image processing algorithm can be any of the following: simple image postprocessing algorithm, classical computer vision, machine learning and/or artificial intelligence algorithm, and/or they can be used in a mix together with each other or other image processing algorithms in accordance with the invention.

In many embodiments a camera type of a pinhole camera is useful as an inventive detection camera that is pitched in the inventive autonomous vehicle.

The experiments and embodiments explained in the aforementioned give rise to the following observations and advantages of the invention. Having examined the advantages and disadvantages of non-zero camera pitch configurations, the following statements can be generally said for all cases:

For any point p in the plane surface in front of the vehicle a non-zero camera pitch can be chosen so that the resulting reconstruction accuracy is better than that of the horizontally placed camera in accordance with the invention, The evolution of the reconstruction accuracy function as a function of the distance from the car is strictly monotonic, which results, that non-zero camera pitch configuration could always yield more accurate input for lane detection independently of the importance function (I(ΔX( );_ΔY ( )), i.e. regardless of the trajectory control model and considerations in accordance with the invention.

For typical camera configurations (focal length, sensor size and camera height) significant improvement in reconstruction accuracy can be achieved at short distances (typically a few meters). This is an important result when using cameras for the creation of high-detailed maps in accordance with the invention.

Optimal orientation (pitch) of the camera for a specific lane detection algorithm and lane keeping solution usually depends on the speed of the vehicle and could be adjusted dynamically in order to reach optimal performance in accordance with the invention.

The invention has been explained in the aforementioned and sizable advantages have been demonstrated. The autonomous vehicle 100 equipped with the variable pitch cameras 110, 111, 112, and/or 113 provides substantially reliable reconstruction accuracies as compared to images produced by horizontally aligned cameras. As the relation of the reconstruction accuracy with a distance of an object from the autonomous vehicle 100 is variable, the non-zero camera pitch configuration yields accurate lane detection results, many times irrespective of any trajectory control model implemented by the autonomous vehicle 100. Also importantly, an optimal pitch of the variable pitch camera 110, 111, 112, or 113 can be varied dynamically based on a speed of the autonomous vehicle 100 and other variables. Substantial improvement in reconstruction accuracy for short distance ranges can also be achieved by adjusting camera configurations, such as, focal length, sensor size, camera height, etc. This is helpful in creating high-detailed maps for facilitating efficient vehicle driving. The invention results in a more precise and reliable camera based detection method that substantially increases road safety associated with vehicles having autonomous or driver assisting solutions. The invention improves high precision lane keeping, provides trajectory control mechanisms and improves pedestrian safety.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

U.S. Pat. No. 9,121,717 B1 COLLISION AVOIDANCE FOR VEHICLE CONTROL, published on Sep. 1, 2015 Jiajun Zhu.

U.S. Pat. No. 5,040,116 VISUAL NAVIGATION AND OBSTACLE AVOIDANCE STRUCTURED LIGHT SYSTEM, published Aug. 13, 1991 Evans et al.

The invention claimed is:

1. An autonomous vehicle, comprising:
at least one camera configured to produce images for computer vision used to control the autonomous vehicle, the at least one camera having a variable and movable pitch in relation to the direction of travel that is configured to be controlled, the pitch of the at least one camera being configured to be changed to maximize camera image clarity and/or resolution as said autonomous vehicle moves,
wherein at least one image from the variable pitch camera is configured to be used in controlling the movement of the autonomous vehicle,
the at least one variable pitch camera is configured to be used in pedestrian detection, and
the variable pitch of the camera is controlled based on a speed of the vehicle.

2. The autonomous vehicle as claimed in claim 1, wherein the variable pitch of the at least one camera is further controlled based on any of the following: weather and/or traffic situation.

3. The autonomous vehicle as claimed in claim 1, the at least one camera includes a plurality of cameras located in different parts of the autonomous vehicle that are configured to perform different tasks.

4. The autonomous vehicle as claimed in claim 3, wherein each of the tasks is configured to be completed at a different camera position and/or orientation.

5. The autonomous vehicle as claimed in claim 1, wherein at least one camera output is processed by an Artificial Intelligence and detection module.

6. The autonomous vehicle as claimed in claim 5, wherein the Artificial Intelligence and detection module is configured to send steering control commands to a Steering unit.

7. The autonomous vehicle as claimed in claim 6, wherein the Steering unit is configured to use the vehicle speed and/or gyroscope data to control and alter a pitch, yaw and/or roll angle of the at least one camera.

8. The autonomous vehicle as claimed in claim 7, wherein the Steering unit (430) is configured to use any of the following: the vehicle speed, an output of the imaging algorithm, mapping info, a Global Positioning System (GPS), and/or the gyroscope data to control and alter the pitch, yaw and/or roll angle of the at least one camera repeatedly in a closed loop, and optionally an improved detection performance is configured to be used to feed a control logic of the autonomous vehicle.

9. A method for controlling an autonomous vehicle including at least one camera configured to produce images for computer vision used to control the autonomous vehicle, the method comprising:
providing at least one said camera having a variable and movable pitch in relation to the direction of travel that is controlled;
changing the pitch of the at least one camera to maximize camera image clarity and/or resolution as said autonomous vehicle moves; and
controlling the movement of the autonomous vehicle using at least one image from the variable pitch camera,
wherein the at least one variable pitch camera is configured to be used in pedestrian detection, and
the variable pitch of the camera is controlled based on a speed of the vehicle.

10. The method as claimed in claim 9, wherein the pitch of the variable pitch camera is controlled based on any of the following: weather and/or traffic situation.

11. The method as claimed in claim 9, wherein the at least one camera includes a plurality of cameras located in different parts of the autonomous vehicle and performing different tasks.

12. The method as claimed in claim 11, wherein each of the tasks is completed at a different camera position and/or orientation.

13. The method as claimed in claim 9, wherein at least one camera output is processed by an Artificial Intelligence and detection module.

14. The method as claimed in claim 9, wherein the output of the Artificial Intelligence and detection module sends steering control commands to a Steering unit.

15. The method as claimed in claim 14, wherein the Steering unit uses the vehicle speed and/or gyroscope data to control and alter a pitch, yaw and/or roll angle of the at least one said camera.

16. The method as claimed in claim 15, wherein the Steering unit uses one or more of the vehicle speed, an output of the imaging algorithm, mapping info, a Global Positioning System, (GPS), and the gyroscope data to control and alter the pitch, yaw and/or roll angle of the at least one camera repeatedly in a closed loop, and optionally an improved detection performance is used to feed a control logic of the autonomous vehicle.

17. A software program product stored on a non-transient memory medium for controlling an autonomous vehicle, comprising:
at least one camera software for at least one camera configured to produce images for computer vision software used to control the autonomous vehicle,
wherein the at least one camera has a variable and movable pitch in relation to the direction of travel that is configured to be controlled, the pitch of the at least one camera is configured to be changed to maximize camera image clarity and/or resolution as said autonomous vehicle moves,
at least one image from the variable pitch camera is configured to be used in controlling the movement of the autonomous vehicle,
the at least one variable pitch camera is configured to be used in pedestrian detection, and
the variable pitch of the camera is controlled based on a speed of the vehicle.

18. The software program product as claimed in claim 17, wherein the pitch of the variable pitch camera is controlled based on any of the following: weather and/or traffic situation.

19. The software program product as claimed in claim 17, wherein the at least one camera includes a plurality of cameras located in different parts of the autonomous vehicle and configured to perform different tasks.

20. The software program product as claimed in claim 19, wherein each of the tasks is configured to be completed at a different camera position and/or orientation.

21. The software program product as claimed in claim 17, wherein at least one camera output is configured to be processed by an Artificial Intelligence and detection module.

22. The software program product as claimed in claim 21, wherein the Artificial Intelligence and detection module is configured to send steering control commands to a Steering unit.

23. The software program product as claimed in claim 22, wherein the Steering unit is configured to use the vehicle speed and/or gyroscope data to control and alter a pitch angle of the at least one camera.

24. The software program product as claimed in claim 23, wherein the Steering unit is configured to use one or more of the vehicle speed, an output of the imaging algorithm, mapping info, a Global Positioning System (GPS), and the gyroscope data to control and alter the pitch, yaw and/or roll angle of the at least one camera repeatedly in a closed loop, and optionally an improved detection performance is configured to be used to feed a control logic of the autonomous vehicle.

\* \* \* \* \*